US007079699B2

(12) United States Patent
Nagahashi

(10) Patent No.: US 7,079,699 B2
(45) Date of Patent: Jul. 18, 2006

(54) MULTI-VALUED IMAGE CONVERSION DEVICE, MULTI-VALUED IMAGE CONVERSION PROGRAM, AND MULTI-VALUED IMAGE CONVERSION METHOD

(75) Inventor: Toshinori Nagahashi, Tatsumo-machi (JP)

(73) Assignee: Seiko Epson Corporation (JP)

( * ) Notice: Subject to any disclaimer, the term of this patent is extended or adjusted under 35 U.S.C. 154(b) by 759 days.

(21) Appl. No.: 10/316,203

(22) Filed: Dec. 10, 2002

(65) Prior Publication Data
US 2003/0112469 A1 Jun. 19, 2003

(30) Foreign Application Priority Data
Dec. 12, 2001 (JP) ............................. 2001-378892

(51) Int. Cl.
*G06K 9/46* (2006.01)
(52) U.S. Cl. .................. 382/252; 382/274; 382/275; 358/3.26; 358/3.27
(58) Field of Classification Search ................ 382/252, 382/260, 274, 275; 358/3.26, 3.27, 518, 358/520
See application file for complete search history.

(56) References Cited

U.S. PATENT DOCUMENTS

| 5,150,429 | A | | 9/1992 | Miller et al. |
| 5,317,653 | A | | 5/1994 | Eschbach et al. |
| 5,621,545 | A | * | 4/1997 | Motta et al. ................. 358/518 |
| 5,737,453 | A | | 4/1998 | Ostromoukhov |
| 5,809,177 | A | | 9/1998 | Metcalfe et al. |
| 5,880,857 | A | | 3/1999 | Shiau et al. |
| 5,982,992 | A | * | 11/1999 | Waldron ..................... 358/1.9 |
| 6,185,002 | B1 | | 2/2001 | Askeland et al. |
| 6,333,793 | B1 | | 12/2001 | Kobayashi |
| 6,483,606 | B1 | * | 11/2002 | Klassen et al. .............. 358/1.9 |
| 6,671,068 | B1 | * | 12/2003 | Chang et al. ................ 358/1.9 |
| 6,847,732 | B1 | * | 1/2005 | Sakatani ..................... 382/167 |

FOREIGN PATENT DOCUMENTS

| JP | 58-186265 | 10/1983 |
| JP | 04-281672 | 10/1992 |
| JP | 5-276363 | 10/1993 |
| JP | 07-288689 | 10/1995 |
| JP | 08-084253 | 3/1996 |
| JP | 09-065126 | 3/1997 |
| JP | 09-065133 | 3/1997 |
| JP | 09-116749 | 5/1997 |
| JP | 09-214760 | 8/1997 |

OTHER PUBLICATIONS

Communication from Japanese Patent Office re counterpart application.
Communication from Japanese Patent Office re: counterpart application.

* cited by examiner

*Primary Examiner*—Samir Ahmed
*Assistant Examiner*—Yosef Kassa
(74) *Attorney, Agent, or Firm*—Harness, Dickey & Pierce, P.L.C.

(57) ABSTRACT

An error when adjacent pixels are converted into binary values while a subject pixel within a color image is scanned is added to the value of the subject pixel at a predetermined ratio, and a value corresponding to the total number of pixels which take the value of "1" among those pixels which are adjacent pixels and which have been subjected to binarization conversion is added to a binarization threshold value Th. Then, when the value of the subject pixel exceeds the binarization threshold value Th, the value of the subject pixel is converted into "1". In contrast, when the value of the subject pixel is equal to or less than the binarization threshold value Th, the value of the subject pixel is converted into "0".

13 Claims, 8 Drawing Sheets

[FIG. 1]
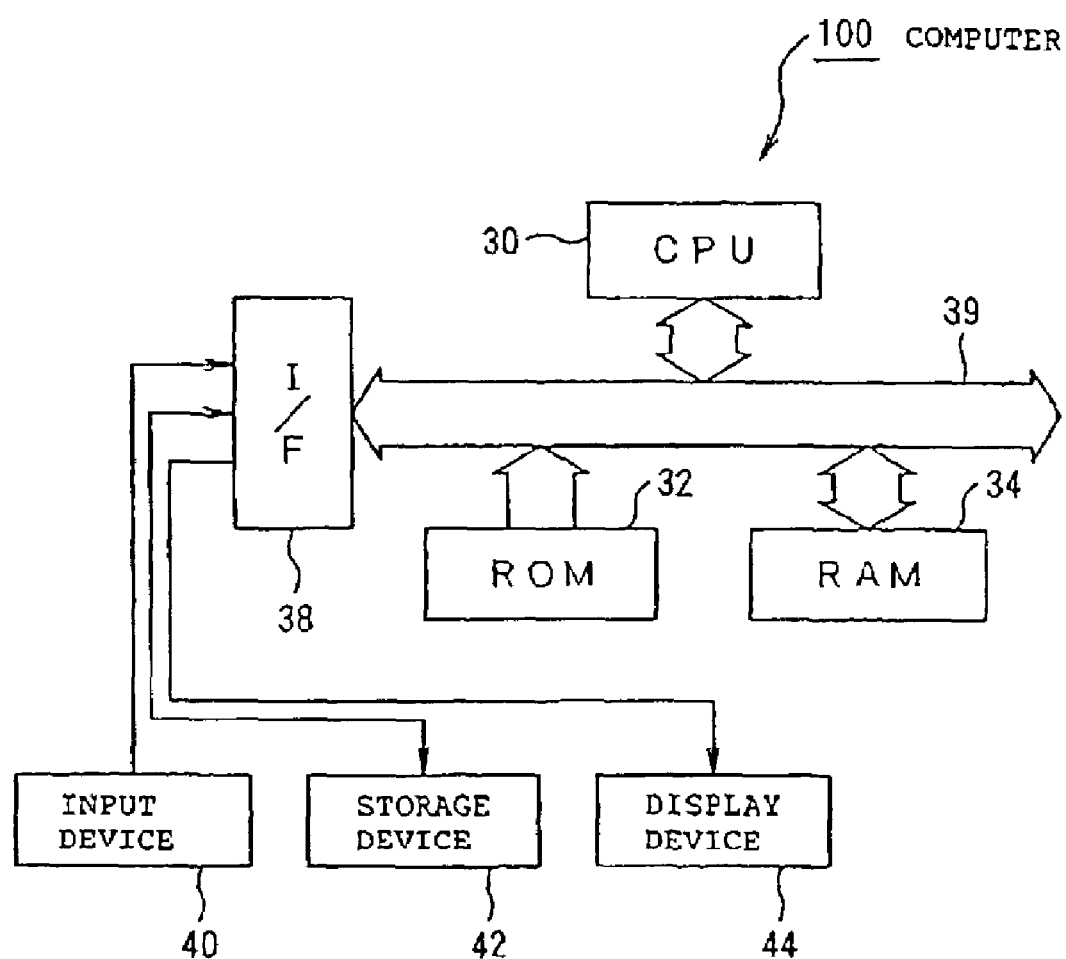

[FIG. 2]
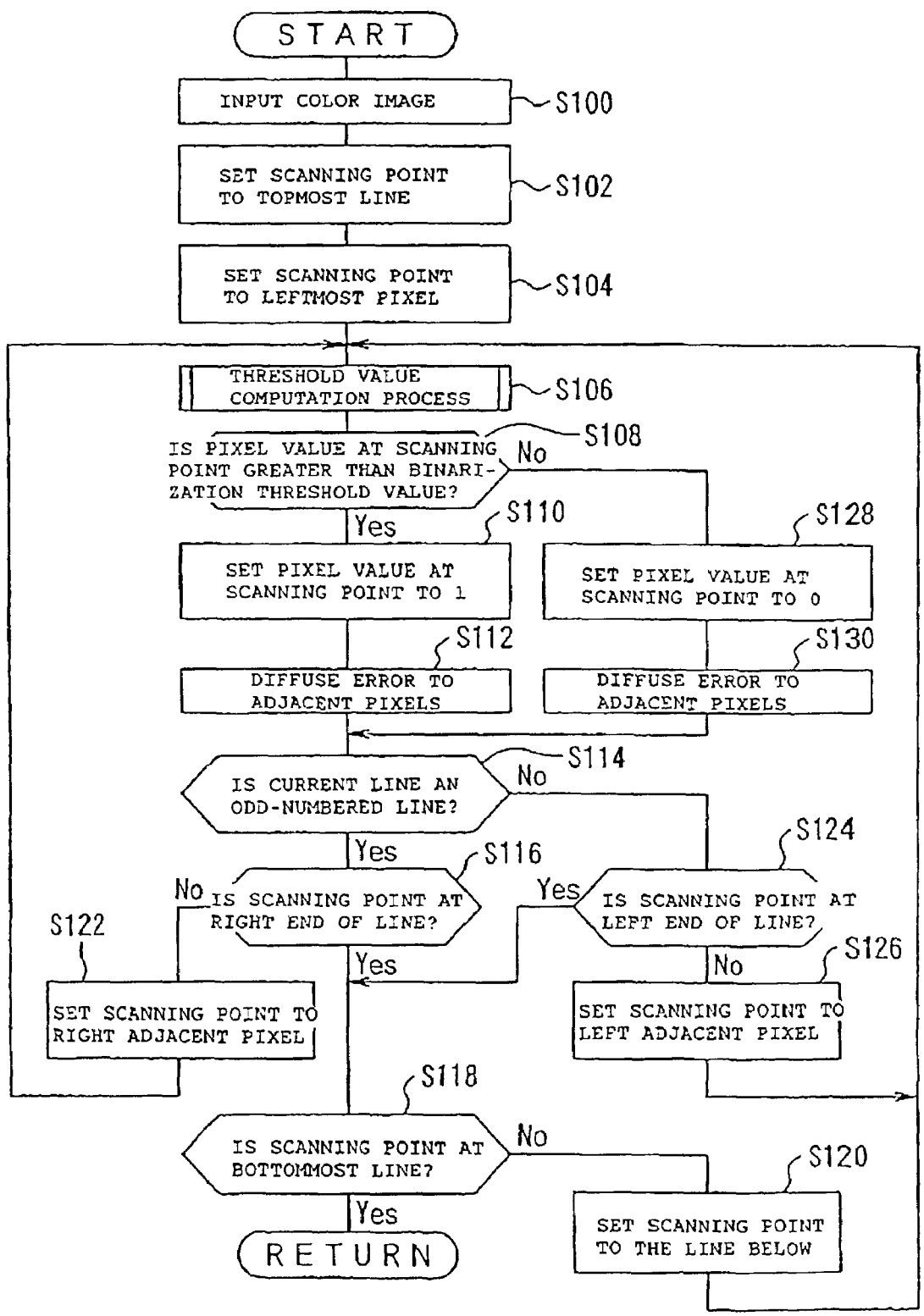

[FIG. 3]
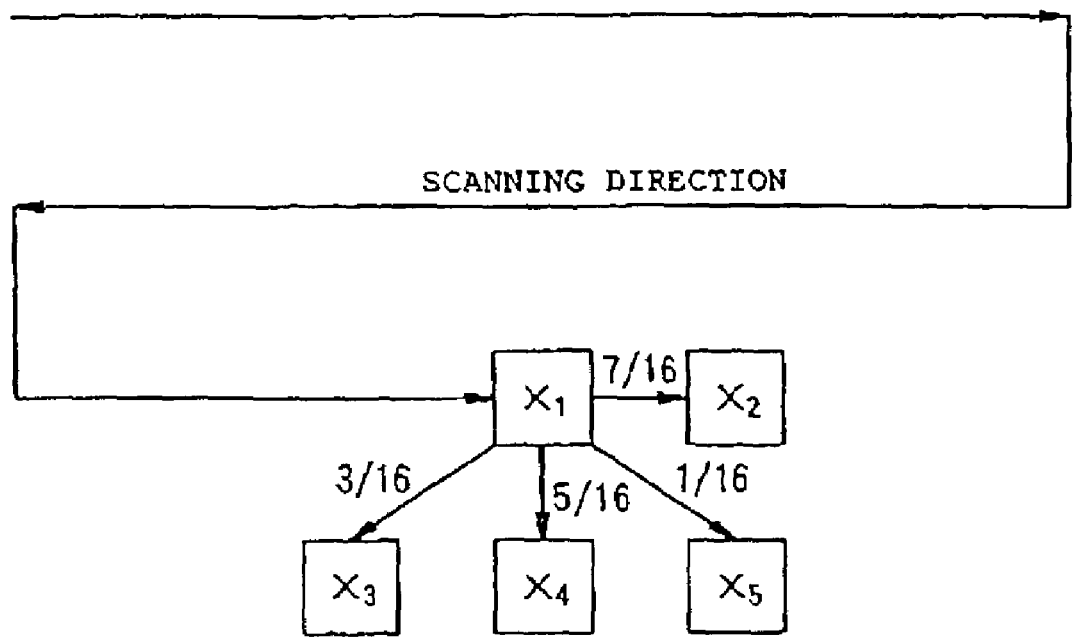

[FIG. 4]
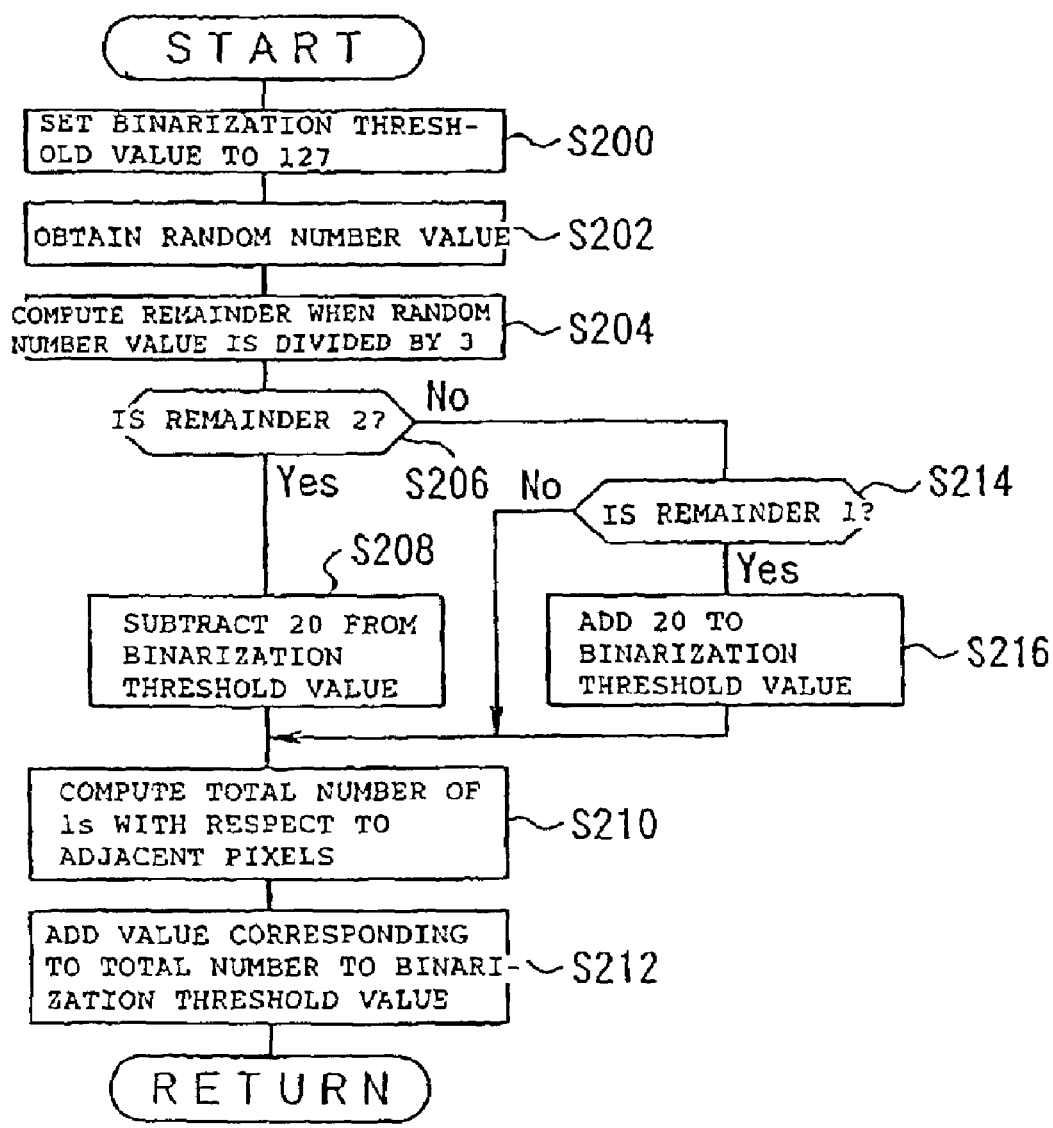

[FIG. 5]
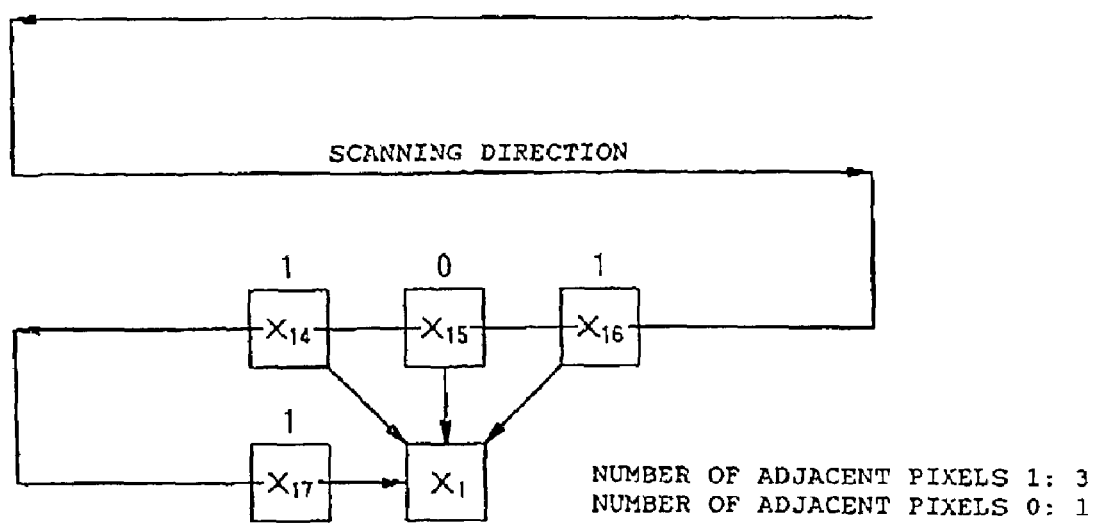

[FIG. 6]
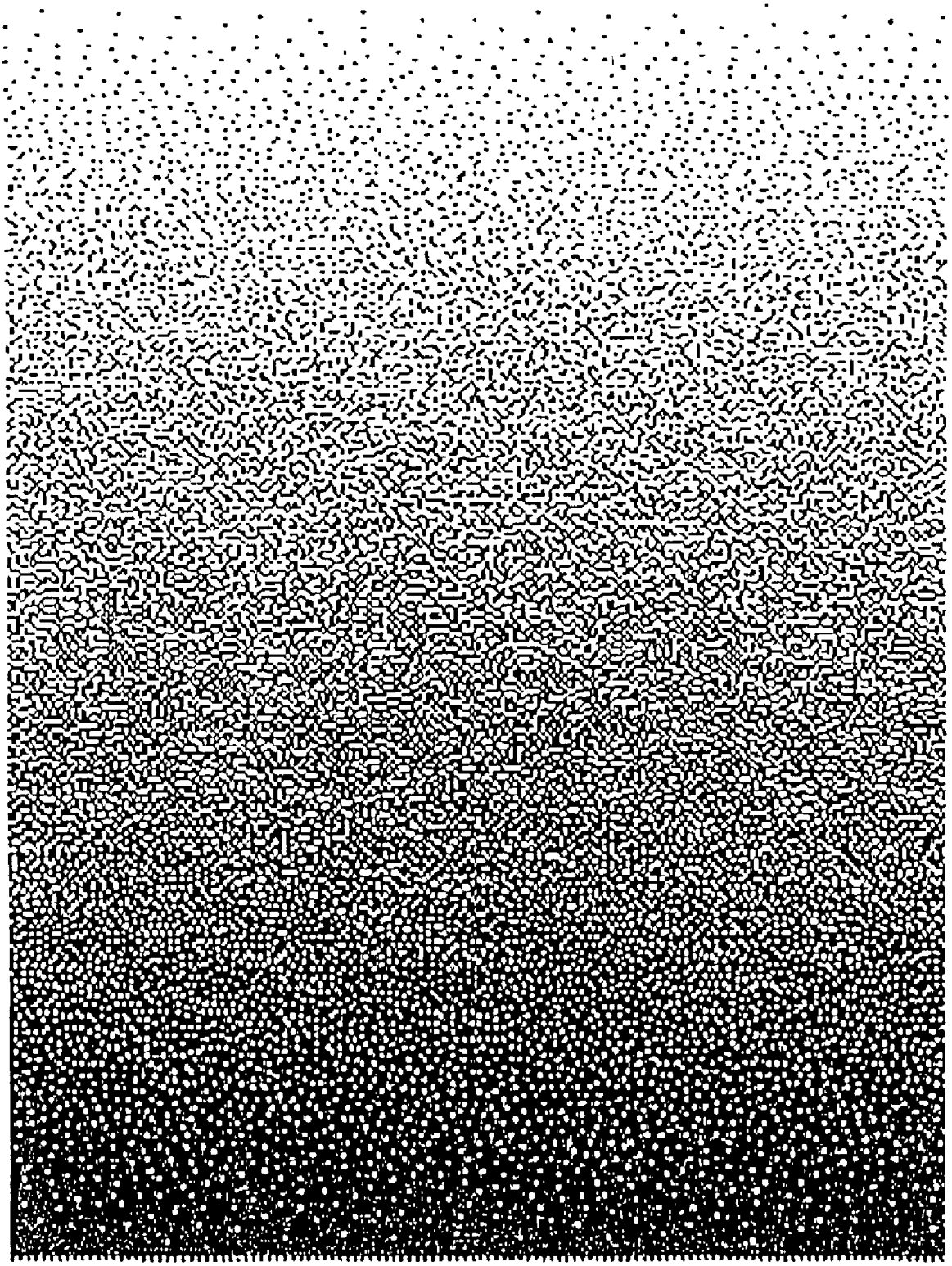

[FIG. 7]
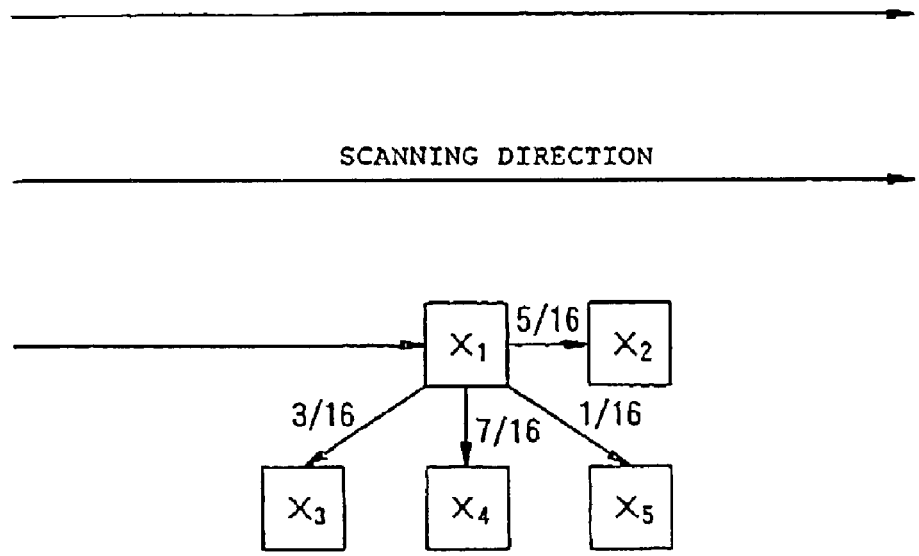
[FIG. 8]
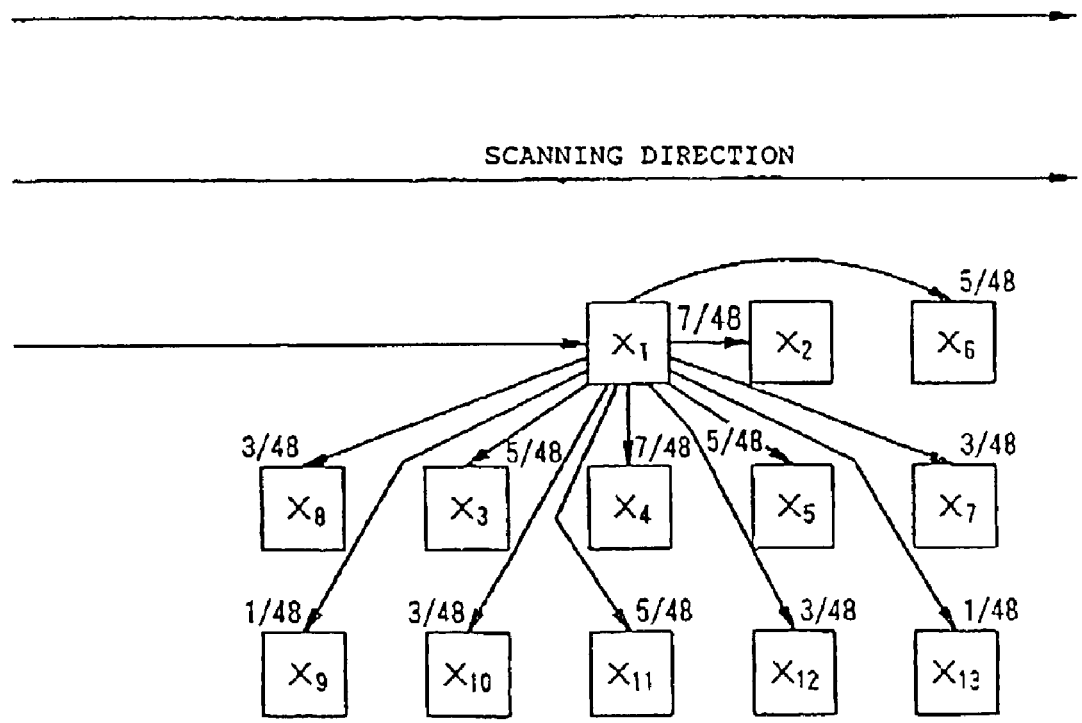

[FIG. 9]
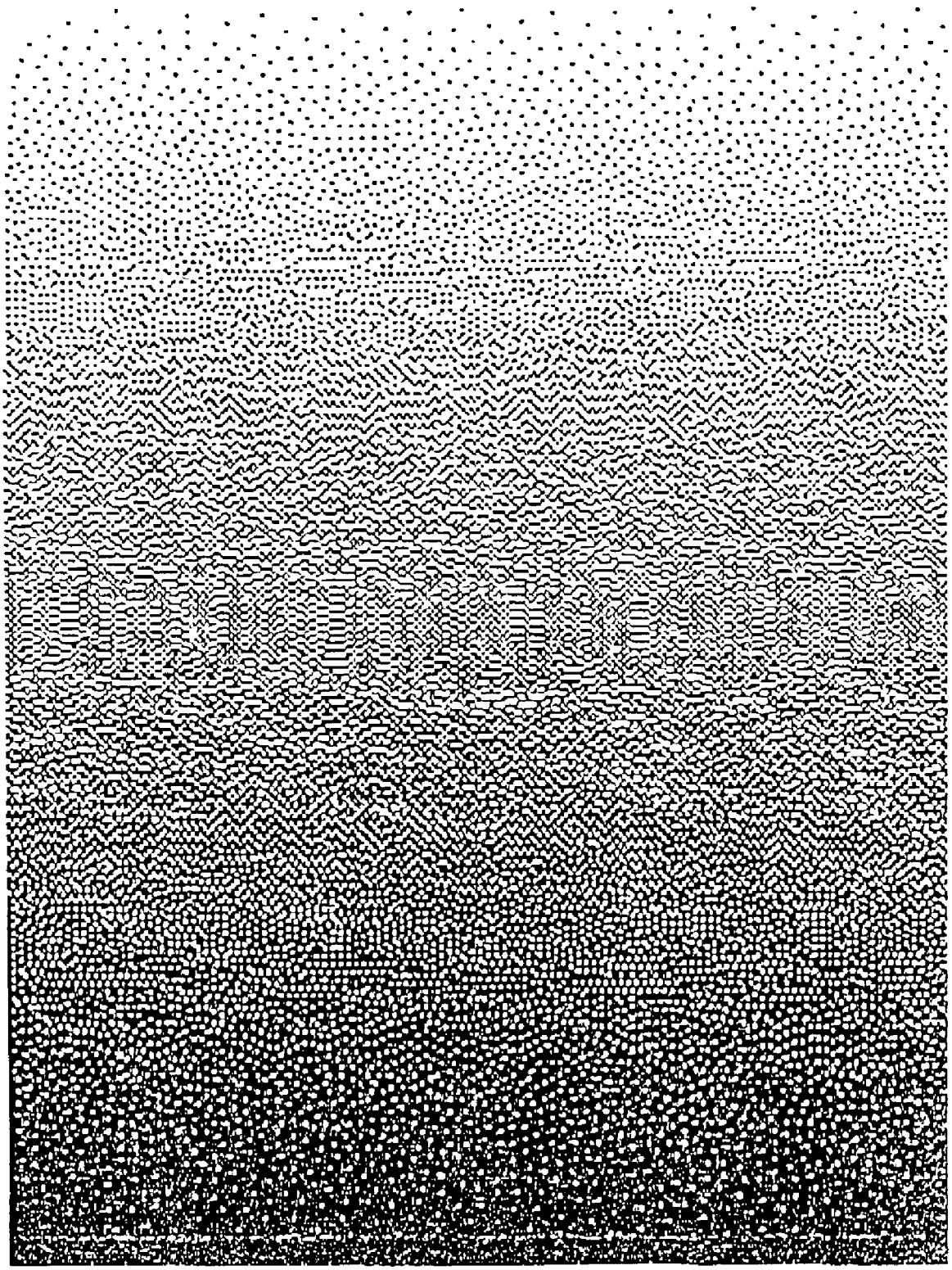

MULTI-VALUED IMAGE CONVERSION DEVICE, MULTI-VALUED IMAGE CONVERSION PROGRAM, AND MULTI-VALUED IMAGE CONVERSION METHOD

BACKGROUND OF THE INVENTION

1. Field of the Invention

The present invention relates to a device for converting a color image into a binary image by an error diffusion method, to a program therefore, and to a method therefore. More particularly, the present invention relates to a multi-valued image conversion device, a multi-valued image conversion program, and a multi-valued image conversion method, which are suitable for reducing the occurrence of artifacts.

2. Description of the Related Art

Hitherto, error diffusion methods have been used as methods of converting color images into binary images. The error diffusion method is one of the methods which are used when a color image composed of a group of pixels which can take N values (for instance, 256 values) is converted into binary images composed of a group of pixels which can take binary values. More specifically, a color image is divided into a plurality of lines in the horizontal direction, and a subject pixel is converted into a pixel having binary values one by one while scanning the subject pixel from left to right on the topmost line. Then, when the right end is reached on the topmost line, the scanning point moves to the left end of the second line. The same process as the above is performed for all the second and subsequent lines until the lower right pixel is reached.

The conversion of the subject pixel is performed as follows. As shown in FIG. 7, in a case where the subject pixel is denoted as $x_1$, and adjacent pixels to the right, the lower left, below, and the lower right of the subject pixel are denoted as $x_2$, $x_3$, $x_4$, and $x_5$, respectively, when the value $x_1$ of the subject pixel $x_1$ exceeds a binarization threshold value Th (for example, Th=127), the pixel value $v_1$ is converted into "1", and when the value $v_1$ of the subject pixel $x_1$ is equal to or less than the binarization threshold value Th, the pixel value $v_1$ is converted into "0". Then, the error when the subject pixel $x_1$ is converted into a binary value is diffused to the adjacent pixels $x_2$ to $x_5$ at a predetermined ratio.

An error $e_1$ of the subject pixel $x_1$ is computed by the following equation (1) when the pixel value $v_1$ of the subject pixel $x_1$ is converted into "1" and is computed by the following equation (2) when the pixel value $v_1$ of the subject pixel $x_1$ is converted into "0":

$$e_1 = v_1 - 255 \quad (1)$$

$$e_1 = v_1 \quad (2)$$

Then, the values $v'_2$ to $v'_5$ of the adjacent pixels $x_2$ to $x_5$ are computed by the following equations (3) to (6) by assuming the original pixel values to be $v_2$ to $v_5$:

$$v'_2 = v_2 + e_1 \times 5/16 \quad (3)$$

$$v'_3 = v_3 + e_1 \times 3/16 \quad (4)$$

$$v'_4 = v_4 + e_1 \times 7/16 \quad (5)$$

$$v'_5 = v_5 + e_1 \times 1/16 \quad (6)$$

Furthermore, in addition to a case in which the error is diffused only to adjacent pixels in this manner, an error diffusion method of diffusing an error to adjacent pixels and to pixels adjacent on the opposite side of the above adjacent pixels from the subject pixel is widely known.

In this case, when neighboring pixels which are adjacent to the right and the lower right of the adjacent pixel $x_2$ are denoted as $x_6$ and $X_7$, respectively, when neighboring pixels which are adjacent to the left, the lower left, below, and the lower right of the adjacent pixel $x_3$ are denoted as $x_8$, $x_9$, $x_{10}$, and $x_{11}$, respectively, and when neighboring pixels which are adjacent below and to the lower right of the adjacent pixel $x_5$ are denoted as $x_{12}$ and $X_{13}$, respectively, the error $e_1$ of the subject pixel $x_1$ is diffused to the adjacent pixels $x_2$ to $x_5$ and to the neighboring pixels $x_6$ to $x_{13}$ at a ratio of 7:5:7:5:5:3:3:1:3:5:3:1, as shown in FIG. 8. As for the ratio, in addition, a ratio of 8:4:8:4:4:2:2:1:2:4:2:1 may be adopted. However, in the conventional error diffusion method, for example, when a color image, such as an image in which the inter-pixel variance is extremely small like that used in computer graphics and a very smooth photograph, is converted into a binary image, an occurrence of the same error repeats periodically. As a result, as shown in FIG. 9, a problem arises in that unique striped patterns (artifacts) occur in the binary image. FIG. 9 shows a binary image in which a color image whose pixel values continuously change from 255 to 0 from the top to the bottom in the vertical direction is converted by a conventional error diffusion method.

SUMMARY OF THE INVENTION

Accordingly, the present invention has been made by considering problems of such conventional technology, which have not yet been solved. An object of the present invention is to provide a multi-valued image conversion device, a multi-valued image conversion program, and a multi-valued image conversion method which are suitable for reducing the occurrence of artifacts. To achieve the above-mentioned object, the multi-valued image conversion device is a device for converting an N-valued (N≧3) image composed of a group of pixels, each pixel capable of taking N values, into an M-valued (N>M≧2) image composed of a group of pixels, each pixel capable of taking M values, the device comprising pixel conversion means for adding an error when neighboring pixels in the neighborhood of a subject pixel are converted into M-valued (N>M≧2) pixels while the subject pixel which is a conversion target within the N-valued image is scanned, to the value of the subject pixel at a predetermined ratio and for converting the subject pixel into M-valued pixels on the basis of the added value, wherein the pixel conversion means further converts the subject pixel into an M-valued pixel on the basis of the values of the neighboring pixels after conversion.

With such an arrangement, the pixel conversion means adds an error when neighboring pixels are converted into M-valued pixels while the subject pixel within the N-valued image is scanned to the value of the subject pixel at a predetermined ratio. Then, based on the added value and the values of the neighboring pixels after conversion, the subject pixel is converted into an M-valued pixel.

Here, the pixel conversion means may be configured in any manner as long as it converts the subject pixel into an M-valued pixel on the basis of the values of the neighboring pixels after conversion. For example, when the value of the pixel after conversion is to be determined on the basis of whether or not the value of the subject pixel exceeds a threshold value, the values of the neighboring pixels after conversion may be reflected in the threshold value or may be reflected in the value of the subject pixel. Hereafter, this applies similarly to the multi-valued image conversion program as set forth in Claim 10 and in the multi-valued image conversion method as set forth in Claim 12.

Neighboring pixels refer to pixels in the neighborhood of the subject pixel, for example, neighboring pixels other than those adjacent to the subject pixel, and neighboring pixels include pixels on the opposite side of the adjacent pixels from the subject pixel. Furthermore, N needs to satisfy the condition of $N \geq 3$. Since N does not take the value of a decimal point from the viewpoint of the nature of the invention, $N>3$ and N is an integer. Furthermore, M needs to satisfy the condition of $N>M \geq 2$. Since M does not take the value of a decimal point from the viewpoint of the nature of the invention, $N>M \geq 2$ and M is an integer.

Furthermore, the multi-valued image conversion device is such that the pixel conversion means computes a threshold value on the basis of the total number of pixels which take a predetermined value among those pixels which are neighboring pixels and which have been subjected to conversion, converts the value of the subject pixel into one of the M values when the value of the subject pixel exceeds the threshold value, and converts the value of the subject pixel into another value of the M values when the value of the subject pixel is equal to or less than the threshold value.

With such an arrangement, the pixel conversion means computes a threshold value on the basis of the total number of pixels which take a predetermined value among those pixels which are neighboring pixels and which have been subjected to conversion. Then, when the value of the subject pixel exceeds the threshold value, the pixel conversion means converts the value of the subject pixel into one of the M values. In contrast, when the value of the subject pixel is equal to or less than the threshold value, the pixel conversion means converts the value of the subject pixel into another value of the M values.

Here, pixels which take a predetermined value among those pixels which are neighboring pixels and which have been subjected to conversion refer to pixels which take the value of "1" or "0" when M=2, and refer to pixels which take one of the values of "0" to "M−1" when M>2.

Furthermore, when M=2, the conversion of the value of the subject pixel into one of the M values refers to that the value of the subject pixel is converted into "1" or "0", and the conversion of the value of the subject pixel into another value of the M values refers to that the value of the subject pixel is converted into "0" or "1". Furthermore, when M>2, the conversion of the value of the subject pixel into one of the M values refers to that the value of the subject pixel is converted into one of the values of "0" to "M−1", and the conversion of the value of the subject pixel into another value of the M values refers to that the value of the subject pixel is converted into a value within "0" to "M−1", other than the one value. That is, when M>2, since conversion into M values using one threshold value is not perfect, a plurality of threshold values need to be used to make this conversion perfect.

Moreover, the multi-valued image conversion device is such that M=2, and the pixel conversion means adds a value corresponding to the total number of pixels which take the value of "1" among those pixels which are neighboring pixels and which have been subjected to conversion to a predetermined reference threshold value, computes the added value as the threshold value, converts the value of the subject pixel into "1" when the value of the subject pixel exceeds the threshold value, and converts the value of the subject pixel into "0" when the value of the subject pixel is equal to or less than the threshold value.

With such an arrangement, the pixel conversion means adds a value corresponding to the total number of pixels which take the value of "1" among those pixels which are neighboring pixels and which have been subjected to conversion to a predetermined reference threshold value, and computes the added value as a threshold value. Then, when the value of the subject pixel exceeds the threshold value, the pixel conversion means converts the value of the subject pixel into "1". In contrast, when the value of the subject pixel is equal to or less than the threshold value, the pixel conversion means converts the value of the subject pixel into "0".

Here, the value corresponding to the total number of pixels may be the total number of pixels itself, and a value such that a predetermined value is added to, subtracted from, multiplied by, or divided with the total number of pixels is included.

Still furthermore, the multi-valued image conversion device is such that the pixel conversion means computes a threshold value on the basis of the total number of pixels which take a predetermined value among those pixels which are neighboring pixels and which have been subjected to conversion and a random number value, converts the value of the subject pixel into one of the M values when the value of the subject pixel exceeds the threshold value, and converts the value of the subject pixel into another value of the M values when the value of the subject pixel is equal to or less than the threshold value.

With such an arrangement, the pixel conversion means computes a threshold value on the basis of the total number of pixels which take a predetermined value among those pixels which are neighboring pixels and which have been subjected to conversion and a random number value. Then, when the value of the subject pixel exceeds the threshold value, the pixel conversion means converts the value of the subject pixel into one of the M values. In contrast, when the value of the subject pixel is equal to or less than the threshold value, the pixel conversion means converts the value of the subject pixel into another value of the M values.

Furthermore, the multi-valued image conversion device is such that M=2, and the pixel conversion means computes a predetermined reference threshold value on the basis of the random number value, adds a value corresponding to the total number of pixels which take the value of "1" among those pixels which are neighboring pixels and which have been subjected to conversion to the predetermined reference threshold value, computes the added value as the threshold value, converts the value of the subject pixel into "1" when the value of the subject pixel exceeds the threshold value, and converts the value of the subject pixel into "0" when the value of the subject pixel is equal to or less than the threshold value.

With such an arrangement, the pixel conversion means computes a predetermined reference threshold value on the basis of a random number value, adds a value corresponding to the total number of pixels which take the value of "1" among those pixels which are neighboring pixels and which have been subjected to conversion to the predetermined reference threshold value, computes the added value as the threshold value. Then, when the value of the subject pixel exceeds the threshold value, the pixel conversion means converts the value of the subject pixel into "1". In contrast, when the value of the subject pixel is equal to or less than the threshold value, the pixel conversion means converts the value of the subject pixel into "0".

Moreover, the multi-valued image conversion device is such that the pixel conversion means divides the N-valued image into a plurality of lines, scans the subject pixel in a predetermined direction along odd-numbered lines of the plurality of lines, and scans the subject pixel in a direction opposite to the predetermined direction along even-numbered lines of the plurality of lines.

With such an arrangement, the pixel conversion means divides the N-valued image into a plurality of lines, scans the subject pixel in a predetermined direction along odd-numbered lines of the plurality of lines. Furthermore, the pixel conversion means scans the subject pixel in a direction opposite to the predetermined direction along even-numbered lines of the plurality of lines.

Still furthermore, the multi-valued image conversion device is a device for converting an N-valued (N>3) image composed of a group of pixels, each pixel capable of taking N values, into an M-valued (N>M≧2) image composed of a group of pixels, each pixel capable of taking M values, the device comprising pixel conversion means for adding an error when neighboring pixels in the neighborhood of a subject pixel are converted into M-valued (N>M≧2) pixels while the subject pixel which is a conversion target within the N-valued image is scanned, to the value of the subject pixel at a predetermined ratio and for converting the subject pixel into an M-valued pixel on the basis of the added value, wherein the pixel conversion means computes a threshold value on the basis of a random number value, converts the value of the subject pixel into one of the M values when the value of the subject pixel exceeds the threshold value, and converts the value of the subject pixel into another value of the M values when the value of the subject pixel is equal to or less than the threshold value.

With such an arrangement, the pixel conversion means adds an error when neighboring pixels in the neighborhood of a subject pixel are converted into M-valued pixels while the subject pixel which is a conversion target within the N-valued image is scanned, to the value of the subject pixel at a predetermined ratio, and computes a threshold value on the basis of a random number value. When the value of the subject pixel exceeds the threshold value, the pixel conversion means converts the value of the subject pixel into one of the M values. In contrast, when the value of the subject pixel is equal to or less than the threshold value, the pixel conversion means converts the value of the subject pixel into another value of the M values.

Moreover, the multi-valued image conversion device is such that M=2, and the pixel conversion means computes the threshold value on the basis of the random number value, converts the value of the subject pixel into "1" when the value of the subject pixel exceeds the threshold value, and converts the value of the subject pixel into "0" when the value of the subject pixel is equal to or less than the threshold value.

With such an arrangement, the pixel conversion means computes a threshold value on the basis of a random number value. Then, when the value of the subject pixel exceeds the threshold value, the pixel conversion means converts the value of the subject pixel into "1". In contrast, when the value of the subject pixel is equal to or less than the threshold value, the pixel conversion means converts the value of the subject pixel into "0".

Furthermore, the multi-valued image conversion device is such that the pixel conversion means divides the N-valued image into a plurality of lines, scans the subject pixel in a predetermined direction along odd-numbered lines of the plurality of lines, and scans the subject pixel in a direction opposite to the predetermined direction along even-numbered lines of the plurality of lines.

With such an arrangement, the pixel conversion means divides an N-valued image into a plurality of lines, and scans the subject pixel in a predetermined direction along odd-numbered lines of the plurality of lines. Furthermore, the pixel conversion means scans the subject pixel in a direction opposite to the predetermined direction along even-numbered lines of the plurality of lines.

To achieve the above-mentioned object, the multi-valued image conversion program is a program for converting an N-valued (N≧3) image composed of a group of pixels, each pixel capable of taking N values, into an M-valued (N>M≧2) image composed of a group of pixels, each pixel capable of taking M values, the program comprising the step of causing a computer to execute a process which is realized as a pixel conversion means for adding an error when neighboring pixels in the neighborhood of a subject pixel are converted into M-valued (N>M≧2) pixels while the subject pixel which is a conversion target within the N-valued image is scanned, to the value of the subject pixel at a predetermined ratio and for converting the subject pixel into an M-valued pixel on the basis of the added value, wherein the pixel conversion means further converts the subject pixel into an M-valued pixel on the basis of the values of the neighboring pixels after conversion.

With such an arrangement, a program is read by a computer, and when the computer executes processing in accordance with the read program, effects comparable to those of the multi-valued image conversion device of the present invention are obtained.

Furthermore, the multi-valued image conversion program according to the present invention is a program for converting an N-valued (N≧3) image composed of a group of pixels, each pixel capable of taking N values, into an M-valued (N>M≧2) image composed of a group of pixels, each pixel capable of taking M values, the program comprising the step of causing a computer to execute a process which is realized as a pixel conversion means for adding an error when neighboring pixels in the neighborhood of a subject pixel are converted into M-valued (N>M≧2) pixels while the subject pixel which is a conversion target within the N-valued image is scanned, to the value of the subject pixel at a predetermined ratio and for converting the subject pixel into an M-valued pixel on the basis of the added value, wherein the pixel conversion means computes a threshold value on the basis of a random number value, converts the value of the subject pixel into one of the M values when the value of the subject pixel exceeds the threshold value, and converts the value of the subject pixel into another value of the M values when the value of the subject pixel is equal to or less than the threshold value.

With such an arrangement, a program is read by a computer, and when the computer executes processing in accordance with the read program, effects comparable to those of the multi-valued image conversion device of the present invention are obtained.

To achieve the above-mentioned object, the multi-valued image conversion method according to the present invention is a method for converting an N-valued (N≧3) image composed of a group of pixels, each pixel capable of taking N values, into an M-valued (N>M≧2) image composed of a group of pixels, each pixel capable of taking M values, the method comprising a pixel conversion step of adding an error when neighboring pixels in the neighborhood of a subject pixel are converted into M-valued (N>M≧2) pixels while the subject pixel which is a conversion target within the N-valued image is scanned, to the value of the subject pixel at a predetermined ratio and converting the subject pixel into an M-valued pixel on the basis of the added value, wherein, in the pixel conversion step, furthermore, the subject pixel is converted into an M-valued pixel on the basis of the values of the neighboring pixels after conversion.

Moreover, the multi-valued image conversion method according to the present invention is a method or converting an N-valued (N≧3) image composed of a group of pixels, each pixel capable of taking N values, into an M-valued (N>M≧2) image composed of a group of pixels, each pixel capable of taking M values, the method comprising a pixel conversion step of adding an error when neighboring pixels in the neighborhood of a subject pixel are converted into M-valued (N>M≧2) pixels while the subject pixel which is a conversion target within the N-valued image is scanned, to the value of the subject pixel at a predetermined ratio and converting the subject pixel into an M-valued pixel on the basis of the added value, wherein, in the pixel conversion step, a threshold value is computed on the basis of a random number value, when the value of the subject pixel exceeds the threshold value, the value of the subject pixel is converted into one of M values, and when the value of the subject pixel equal to or less than the threshold value, the value of the subject pixel is converted into another value of the M values.

BRIEF DESCRIPTION OF THE DRAWINGS

FIG. 1 is a block diagram showing the configuration of a computer 100.

FIG. 2 is a flowchart showing a color image conversion process.

FIG. 3 illustrates a case in which an error $e_1$ of a subject pixel $x_1$ is diffused to adjacent pixels $x_2$ to $X_5$.

FIG. 4 is a flowchart showing a threshold-value computation process of step S106.

FIG. 5 illustrates a case in which the total number of pixels among the adjacent pixels which take the value of "1" $x_{14}$ to $x_{17}$ is computed. FIG. 6 shows a binary image obtained by converting a color image whose pixel values continuously change from 255 to 0 from top to bottom in the vertical direction by a conversion method of the present invention.

FIG. 7 illustrates a case in which an error $e_1$ of a subject pixel $x_1$ is diffused to adjacent pixels $x_2$ to $x_5$.

FIG. 8 illustrates a case in which an error $e_1$ of a subject pixel $x_1$ is diffused to adjacent pixels $x_2$ to $x_5$ and neighboring pixels $x_6$ to $x_{13}$.

FIG. 9 shows a binary image obtained by converting a color image whose pixel values continuously change from 255 to 0 from top to bottom in the vertical direction by a conventional error diffusion method.

DETAILED DESCRIPTION OF THE PREFERRED EMBODIMENTS

Embodiments of the present invention will be described below with reference to the drawings. FIGS. 1 to 6 show embodiments of a multi-valued image conversion device, a multi-valued image conversion program, and a multi-valued image conversion method according to the present invention.

These embodiments are such that the multi-valued image conversion device, the multi-valued image conversion program, and the multi-valued image conversion method according to the present invention are used in a case where a color image is converted into a binary image by a computer 100, as shown in FIG. 1.

First, the configuration of the computer 100 to which the present invention is applied will be described in detail with reference to FIG. 1. FIG. 1 is a block diagram showing the configuration of the computer 100.

The computer 100, as shown in FIG. 1, comprises a CPU 30 for controlling computations and the entire system in accordance with a control program; a ROM 32 having the control program, etc., for the CPU 30 stored in a predetermined area; a RAM 34 for storing data read from the ROM 32, etc., and computation results necessary for computation steps performed by the CPU 30; and an interface 38 for interfacing for inputting/outputting data to and from external devices. These are interconnected with each other in such a manner that data can be exchanged through a bus 39, which is a signal line for transferring data.

As external devices, an input device 40 formed of a keyboard, a mouse, etc., serving as a human interface, from which data can be input, a storage device 42 for storing data, tables, etc., as files, and a display device 44 for displaying the screen in accordance with image signals are connected to the interface 38.

The CPU 30, formed of a microprocessing unit (MPU), etc., starts a predetermined program stored in a predetermined area of the ROM 32, and a color image conversion process shown in the flowchart in FIG. 2 is performed in accordance with that program. FIG. 2 is a flowchart showing the color image conversion process.

The color image conversion process is a process for converting a color image composed of a group of pixels, each pixel capable of taking N values (for instance, 256 values), into a binary image composed of a group of pixels, each pixel capable of taking binary values. When the process is performed in the CPU 30, as shown in FIG. 2, the process proceeds to step S100.

In step S100, a color image is input, and then the process proceeds to step S102, where the input color image is divided into a plurality of lines in the horizontal direction, and the scanning point for scanning a subject pixel, which is a conversion target, within the color image is set to the topmost line. Then, the process proceeds to step S104, where the scanning point is set to the leftmost pixel on the current line, and then the process proceeds to step S106.

In step S106, a threshold-value computation process for computing a binarization threshold value Th is performed. Then, the process proceeds to step S108, where it is determined whether or not the value of the pixel at the scanning point exceeds the binarization threshold value Th computed in step S106. If it is determined that the value of the pixel at the scanning point exceeds the binarization threshold value Th (Yes), the process proceeds to step S110.

In step S110, the value of the pixel at the scanning point is converted into "1", and then the process proceeds to step S112, where the error when the value of the pixel at the scanning point is converted into "1" is diffused at a predetermined ratio to those pixels which are adjacent to the pixel at the scanning point and which have not been subjected to binarization conversion. More specifically, in step S112, as shown in FIG. 3, when the subject pixel is denoted as $x_1$, and adjacent pixels to the right, the lower left, the bottom, and the lower right of the subject pixel are denoted as $x_2$, $x_3$, $x_4$, and $x_5$, respectively, an error $e_1$ of the subject pixel $x_1$ is computed by equation (1) described above, and the values $v'_2$ to $v'_5$ of the adjacent pixels $x_2$ to $x_5$ are computed by equations (3) to (6) described above, thus diffusing the error $e_1$. FIG. 3 illustrates a case in which the error $e_1$ of the subject pixel $x_1$ is diffused to the adjacent pixels $x_2$ to $x_5$. FIG. 3 shows a case in which the scanning direction of the subject pixel $x_1$ is from left to right. Alternatively, in a case where the scanning direction is from right to left, the only differences are as follows: the adjacent pixel $x_2$ is positioned to the left and the ratio of the error diffusion is symmetrical, and the rest is the same.

Next, in step S114, it is determined whether or not the current line is an odd-numbered line. If it is determined that the current line is an odd-numbered line (Yes), the process proceeds to step S116, where it is determined whether or not the scanning point is set to the rightmost pixel on the current line. If it is determined that the scanning point is set to the rightmost pixel (Yes), the process proceeds to step S118.

In step S118, it is determined whether or not the scanning point is set to the bottommost line. If it is determined that the scanning point is set to the bottommost line (Yes), the series of processes is terminated, and control returns to its original process.

On the other hand, if it is determined in step S118 that the scanning point is not set to the bottommost line (No), the process proceeds to step S120, where the scanning point is set to the line one line below the current line, and the process proceeds to step S106.

On the other hand, if it is determined in step S116 that the scanning point is not set to the rightmost pixel on the current line (No), the process proceeds to step S122, where the scanning point is set to the adjacent pixel to the right on the current line, and the process proceeds to step S106.

On the other hand, if it is determined in step S114 that the current line is an even-numbered line (No), the process proceeds to step S124, where it is determined whether or not the scanning point is set to the leftmost pixel on the current line. If it is determined that the scanning point is set to the leftmost pixel (Yes), the process proceeds to step S118.

On the other hand, if it is determined in step S124 that the scanning point is not set to the leftmost pixel on the current line (No), the process proceeds to step S126, where the scanning point is set to the adjacent pixel to the left on the current line, and the process proceeds to step S106.

On the other hand, if it is determined in step S108 that the value of the pixel at the scanning point is equal to or less than the binarization threshold value Th computed in step S106 (No), the process proceeds to step S128.

In step S128, the value of the pixel at the scanning point is converted into "0", and then the process proceeds to step S130, where the error when the value of the pixel at the scanning point is converted into "0" is diffused at a predetermined ratio to those pixels which are adjacent to the pixel at the scanning point and which have not been subjected to binarization conversion, and the process proceeds to step S114. More specifically, in step S130, as shown in FIG. 3, when the subject pixel at the scanning point is denoted as $x_1$, and adjacent pixels to the right, the lower left, the bottom, and the lower right of the subject pixel are denoted as $x_2$, $x_3$, $x_4$, and $x_5$, respectively, the error $e_1$ of the subject pixel $x_1$ is computed by equation (2) described above, and the values $v'_2$ to $v'_5$ of the adjacent pixels $x_2$ to $x_5$ are computed by equations (3) to (6) described above, thus diffusing the error $e_1$.

Next, referring to FIG. 4, a detailed description will be given of the threshold-value computation process of step S106 described above. FIG. 4 is a flowchart showing the threshold-value computation process of step S106 described above.

When the threshold-value computation process is performed in step S106, as shown in FIG. 4, first, the process proceeds to step S200.

In step S200, the binarization threshold value Th is set to "127", and then the process proceeds to step S202, where a random number value capable of taking a value of 3 or more is obtained. Then, the process proceeds to step S204, where the remainder when the obtained random number value is divided by "3" is computed, and then the process proceeds to step S206.

In step S206, it is determined whether or not the remainder computed in step S204 is "2". When it is determined that the remainder is "2" (Yes), the process proceeds to step S208, where "20" is subtracted from the binarization threshold value Th in order to set the binarization threshold value Th to "107", and the process proceeds to step S210.

In step S210, the total number of pixels which take the value of "1" among those pixels which are adjacent pixels and which have been subjected to binarization conversion is computed. More specifically, in step S210, as shown in FIG. 5, when the subject pixel, which is the pixel at the scanning point, is denoted as $x_1$, and adjacent pixels to the upper left, above, the upper right, and the left of the subject pixel are denoted as $x_{14}$, $x_{15}$, $x_{16}$, and $x_{17}$, respectively, since the adjacent pixels $x_{14}$ to $x_{17}$ have already been converted into binary values, the total number of pixels which take the value of "1" among the adjacent pixels $x_{14}$ to $x_{17}$ is computed. Alternatively, in the example of FIG. 5, since there are three pixels which take the value of "1", the total number is "3". FIG. 5 illustrates a case in which the total number of pixels which take the value of "1" among the adjacent pixels $x_{14}$ to $x_{17}$ is computed. FIG. 5 shows a case in which the scanning direction of the subject pixel $x_1$ is from left to right. Alternatively, in a case where the scanning direction is from right to left, the only differences are as follows: the adjacent pixel $x_{17}$ is positioned to the right and the ratio of the error diffusion is symmetrical, and the rest is the same.

Next, the process proceeds to step S212, where the total number computed in step S210 multiplied by a predetermined value (for example, 10) is added to the binarization threshold value Th, the series of processes is terminated, and control returns to its original process. When FIG. 5 is used as an example, in a case where the remainder when the random number value is divided by 3 is "2", as a result of the computation in step S212, the binarization threshold value Th becomes "137" by adding "30" to "107".

On the other hand, if it is determined in step S206 that the remainder computed in step S204 is not "2" (No), the process proceeds to step S214, where it is determined whether or not the remainder computed in step S204 is "1". If it is determined that the remainder is "1" (Yes), the process proceeds to step S216, where "20" is added to the binarization threshold value Th in order to set the binarization threshold value Th to "147", and then the process proceeds to step S210.

On the other hand, if it is determined in step S214 that the remainder computed in step S204 is not "1" (No), the process proceeds to step S210.

Next, the operation of this embodiment will be described with reference to FIG. 6. FIG. 6 shows a binary image obtained by converting a color image whose pixel values continuously change from 255 to 0 from top to bottom in the vertical direction using the conversion method of the present invention.

Initially, when a color image is input, the scanning point is set to the topmost line through steps S102 to S106, the scanning point is set to the leftmost pixel on the current line, and the binarization threshold value Th is computed by the threshold-value computation process. Next, if value of the pixel at the scanning point exceeds the binarization threshold value Th, through steps S110 and S112, the value of the pixel at the scanning point is converted into "1", and the error when the value of the pixel at the scanning point is converted into "1" is diffused at a predetermined ratio to those pixels which are adjacent to the pixel at the scanning point and which have not been subjected to binarization conversion. In contrast, if the value of the pixel at the scanning point is equal to or less than the binarization threshold value Th, through steps S128 and S130, the value of the pixel at the scanning point is converted into "0". The error when the value of the pixel at the scanning point is converted into "0" is diffused at a predetermined ratio to those pixels which are adjacent to the pixel at the scanning point and which have not been subjected to binarization conversion.

On the topmost line, since the line is an odd-numbered line, as a result of repeatedly undergoing steps S114, S116, and S122, while the scanning point moves from left to right on the same line, through the processes of steps S110 and S112 or through the processes of steps S128 and S130, the pixel at the scanning point is converted into a pixel having binary values one by one. Then, when the scanning point moves to the rightmost pixel, the scanning point moves to the second line.

On the second line, since the line is an even-numbered line, as a result of repeatedly undergoing steps S114, S124, and S126, while the scanning point moves from right to left on the same line, through the processes of steps S110 and S112 or through the processes of steps S128 and S130, the pixel at the scanning point is converted into a pixel having binary values one by one. Then, when the scanning point moves to the leftmost pixel, the scanning point moves to the third line.

On the third and subsequent lines, in the same manner as for the topmost line or the second line, the scanning point moves in a zigzag manner over every odd-numbered line and every even-numbered line, and the pixel at the scanning point is converted to a pixel having binary values one by one.

The binarization threshold value Th is computed by the threshold-value computation process through step S104. In the threshold-value computation process, through steps S200 to S204, the binarization threshold value Th is set to "127", a random number value capable of taking a value of 3 or more is obtained, and the remainder when the obtained random number value is divided by "3" is computed.

In a case where the remainder when the random number value is divided by "3" is "2", through step S208, "20" is subtracted from the binarization threshold value Th, and as a result, the binarization threshold value Th is set to "107". Furthermore, in a case where the remainder when the random number value is divided by "3" is "1", through step S216, "20" is added to the binarization threshold value Th, and as a result, the binarization threshold value Th is set to "147".

Then, through steps S210 and S212, the total number of pixels which take the value of "1" among those pixels which are adjacent pixels and which have been subjected to binarization conversion is computed. The computed total number is multiplied by a predetermined value, and the multiplied value is added to the binarization threshold value Th. As a result, the binarization threshold value Th is computed.

As a result of the above, conventionally, as shown in FIG. 9, artifacts occur in the binary image. In contrast, in this embodiment, when a color image whose pixel values continuously change from 255 to 0 from top to bottom in the vertical direction is converted into a binary image, as shown in FIG. 6, it can be seen that the occurrence of artifacts in the binarized image is reduced.

In this manner, in this embodiment, an error when adjacent pixels are converted into binary values while the subject pixel within a color image is scanned is added to the value of the subject pixel at a predetermined ratio, and a value corresponding to the total number of pixels which take the value of "1" among those pixels which are adjacent pixels and which have been subjected to binarization conversion is added to the binarization threshold value Th. When the value of the subject pixel exceeds the binarization threshold value Th, the value of the subject pixel is converted into "1", and when the value of the subject pixel is equal to or less than the binarization threshold value Th, the value of the subject pixel is converted into "0".

As a result, when converting the subject pixel into a binary value, since the error of the adjacent pixels as well as the total number of pixels which take the value of "1" among those pixels which are adjacent pixels and which have been subjected to binarization conversion are taken into consideration, the occurrence of artifacts in the binary image can be reduced in comparison with the conventional case.

In addition, in this embodiment, the binarization threshold value Th is computed based on a random number value. A value corresponding to the total number of pixels which take the value of "1" among those pixels which are adjacent pixels and which have been subjected to binarization conversion is added to the binarization threshold value Th. When the value of the subject pixel exceeds the binarization threshold value Th, the value of the subject pixel is converted into "1", and when the value of the subject pixel is equal to or less than the binarization threshold value Th, the subject pixel is converted into "0".

As a result, when computing the binarization threshold value Th, since a random number value is considered, it is possible to reduce the occurrence of artifacts in the binary image.

Furthermore, in this embodiment, a color image is divided into a plurality of lines in the horizontal direction, and for the odd-numbered lines of the plurality of lines, the subject pixel is scanned in a predetermined direction along those lines, and for the even-numbered lines of the plurality of lines, the subject pixel is scanned in a direction opposite to the predetermined direction along those lines.

As a result, since the scanning direction of the subject pixel is opposite every other line, the occurrence of artifacts in the binary image can be reduced further.

In the above-described embodiment, the color image corresponds to the N-valued image; the binary image corresponds to the M-valued image; and steps S100 to S130 correspond to the pixel conversion means or the pixel conversion step.

In the above-described embodiment, a color image composed of a group of pixels, each pixel capable of taking 256 values, is converted into a binary image composed of a group of pixels, each pixel capable of taking binary values. Alternatively, an N-valued image composed of a group of pixels, each pixel capable of taking N values ($N \geq 4$ (excluding $N=256$)), may be converted into an M-valued image composed of a group of pixels, each pixel capable of taking M ($N > M \geq 3$) values.

In the above-described embodiment, a color image is divided into a plurality of lines in the horizontal direction, and binarization conversion is performed for each line.

Alternatively, a color image may be divided into a plurality of lines in the vertical direction or in an oblique direction, and binarization conversion may then be performed for each line.

In the above-described embodiment, a color image is converted into a binary image. Alternatively, when a color image is to be printed using a printer, the color image may be converted into a binary image by the conversion method of the present invention, and printing may then be performed on the basis of the converted binary image data. Furthermore, when a color image is to be displayed on a display device, the color image may be converted into a binary image by the conversion method of the present invention, and the color image may then be displayed on the basis of the converted binary image data.

As a result, it is possible to obtain a comparatively satisfactory printed result or displayed result in which the occurrence of artifacts is low.

In the above-described embodiment, the binarization threshold value Th is computed on the basis of a random number value. Alternatively, even a construction in which the binarization threshold value Th is not computed on the basis of a random number value and the value corresponding to the total number of pixels among the adjacent pixels which take the value of "1" is added to the binarization threshold value Th makes it possible to reduce the occurrence of artifacts compared to the conventional error diffusion method.

In the above-described embodiment, the value corresponding to the total number of pixels among the adjacent pixels which take the value of "1" is added to the binarization threshold value. Alternatively, even a construction in which the value corresponding to the total number of pixels among the adjacent pixels which take the value of "1" is not added to the binarization threshold value and the binarization threshold value Th is computed on the basis of a random number value makes it possible to reduce the occurrence of artifacts compared to the conventional error diffusion method.

In the above-described embodiment, the scanning direction of the subject pixel is opposite every other line. Alternatively, even a construction in which the scanning direction does not zigzag and the value corresponding to the total number of pixels among the adjacent pixels which take the value of "1" is added to the binarization threshold value makes it possible to reduce the occurrence of artifacts compared to the conventional error diffusion method.

In the above-described embodiment, the scanning direction of the subject pixel is opposite every other line. Alternatively, even a construction in which the scanning direction of the subject pixel does not zigzag and the binarization threshold value Th is computed on the basis of a random number value makes it possible to reduce the occurrence of artifacts compared to the conventional error diffusion method.

In the above-described embodiment, in the example of FIG. 3, the ratio at which the error is diffused to the adjacent pixels $x_2$ to $x_5$ is 7:3:5:1. Alternatively, in other cases, the most appropriate ratio can be adopted as necessary.

In the above-described embodiment, the error of the subject pixel is diffused only to adjacent pixels. Alternatively, the error of the subject pixel may be diffused to adjacent pixels as well as to pixels on the opposite side of the adjacent pixels from the subject pixel.

In the above-described embodiment, when each of the processes shown in the flowcharts in FIGS. 2 and 4 is to be performed, a description is given of a case in which control programs prestored in the ROM 32 are executed. Alternatively, a program may be read into the RAM 34 from a storage medium in which the program describing the procedure of these processes is stored, and the program may then be executed.

Here, storage medium refers to a semiconductor storage medium, such as a RAM or a ROM; a magnetic storage medium, such as an FD or a HD; an optical reading storage medium, such as a CD, a CDV, an LD, or a DVD; or a magnetic/optical reading storage medium, such as an MO. The storage medium may include any type of storage medium as long as it is a storage medium which can be read by a computer regardless of whether the reading method is an electronic, magnetic, or optical reading method.

In the above-described embodiment, the multi-valued image conversion device, the multi-valued image conversion program, and the multi-valued image conversion method according to the present invention are used in a case in which a color image is converted into a binary image by the computer 100. Alternatively, they can be used in other cases within the spirit and scope of the present invention.

As has thus been described, according to the multi-valued image conversion device in accordance with the present invention, when converting the subject pixel, since the error of neighboring pixels as well as the values of neighboring pixels after conversion are considered, it is possible to obtain an advantage in that the occurrence of artifacts in an M-valued image can be reduced in comparison with a conventional case.

Moreover, when converting the subject pixel, since the error of neighboring pixels as well as the total number of pixels which take a predetermined value among those pixels which are neighboring pixels and which have been subjected to binarization conversion is considered, it is also possible to obtain an advantage in that the occurrence of artifacts in an M-valued image can be reduced even more.

Furthermore, according to the multi-valued image conversion device in accordance with the present invention, when computing a threshold value, since a random number value is considered, it is also possible to obtain an advantage in that the occurrence of artifacts in an M-valued image can be reduced even more.

Furthermore, since the scanning direction of the subject pixel reverses every other line, it is also possible to obtain an advantage in that the occurrence of artifacts in an M-valued image can be reduced even more.

Still furthermore, since the error of neighboring pixels is considered when the subject pixel is to be converted and a random number value is considered when the threshold value is to be computed, it is possible to obtain an advantage in that the occurrence of artifacts in an M-valued image can be reduced in comparison with a conventional case.

Furthermore, since the scanning direction of the subject pixel reverses every other line, it is also possible to obtain an advantage in that the occurrence of artifacts in an M-valued image can be reduced even more.

The entire disclosure of Japanese Patent Application No. 2001-378892 filed Dec. 12, 2001 is hereby incorporated by reference.

What is claimed is:

1. A multi-valued image conversion device for converting an N-valued (N≧3) image composed of a group of pixels, each pixel capable of taking N values, into an M-valued (N>M≧2) image composed of a group of pixels, each pixel capable of taking M values, said device comprising:

pixel conversion means for adding an error when neighboring pixels in the neighborhood of a subject pixel are converted into M-valued (N>M≧2) pixels while the subject pixel, which is a conversion target within said N-valued image, is scanned, to the value of said subject pixel at a predetermined ratio and for converting said subject pixel into M-valued pixels on the basis of the added value, wherein said pixel conversion means further converts said subject pixel into an M-valued pixel on the basis of the values of said neighboring pixels after conversion.

2. A multi-valued image conversion device according to claim 1, wherein said pixel conversion means computes a threshold value on the basis of the total number of pixels which take a predetermined value among those pixels which are said adjacent pixels and which have been subjected to conversion, converts the value of said subject pixel into one of the M values when the value of said subject pixel exceeds said threshold value, and converts the value of said subject pixel into another value of the M values when the value of said subject pixel is equal to or less than said threshold value.

3. A multi-valued image conversion device according to claim 2, wherein M=2, and said pixel conversion means adds a value corresponding to the total number of pixels which take the value of "1" among those pixels which are said adjacent pixels and which have been subjected to conversion to a predetermined reference threshold value, computes the added value as said threshold value, converts the value of said subject pixel into "1" when the value of said subject pixel exceeds said threshold value, and converts the value of said subject pixel into "0" when the value of said subject pixel is equal to or less than said threshold value.

4. A multi-valued image conversion device according to claim 1, wherein said pixel conversion means computes a threshold value on the basis of the total number of pixels which take a predetermined value among those pixels which are said adjacent pixels and which have been subjected to conversion and a random number value, converts the value of said subject pixel into one of the M values when the value of said subject pixel exceeds said threshold value, and converts the value of said subject pixel into another value of the M values when the value of said subject pixel is equal to or less than said threshold value.

5. A multi-valued image conversion device according to claim 4, wherein M=2, and said pixel conversion means computes a predetermined reference threshold value on the basis of said random number value, adds a value corresponding to the total number of pixels which take the value of "1" among those pixels which are said adjacent pixels and which have been subjected to conversion to said predetermined reference threshold value, computes the added value as said threshold value, converts the value of said subject pixel into "1" when the value of said subject pixel exceeds said threshold value, and converts the value of said subject pixel into "0" when the value of said subject pixel is equal to or less than said threshold value.

6. A multi-valued image conversion device according to claim 1, wherein said pixel conversion means divides said N-valued image into a plurality of lines, scans said subject pixel in a predetermined direction along odd-numbered lines of said plurality of lines, and scans said subject pixel in a direction opposite to said predetermined direction along even-numbered lines of said plurality of lines.

7. A multi-valued image conversion device for converting an N-valued (N≧3) image composed of a group of pixels, each pixel capable of taking N values, into an M-valued (N>M≧2) image composed of a group of pixels, each pixel capable of taking M values, said device comprising:

pixel conversion means for adding an error when neighboring pixels in the neighborhood of a subject pixel are converted into M-valued (N>M≧2) pixels while the subject pixel which is a conversion target within said N-valued image is scanned, to the value of said subject pixel at a predetermined ratio and for converting said subject pixel into an M-valued pixel on the basis of the added value, wherein said pixel conversion means computes a threshold value on the basis of a random number value, converts the value of said subject pixel into one of the M values when the value of said subject pixel exceeds said threshold value, and converts the value of said subject pixel into another value of the M values when the value of said subject pixel is equal to or less than said threshold value.

8. A multi-valued image conversion device according to claim 7, wherein M=2, and said pixel conversion means computes said threshold value on the basis of said random number value, converts the value of said subject pixel into "1" when the value of said subject pixel exceeds said threshold value, and converts the value of said subject pixel into "0" when the value of said subject pixel is equal to or less than said threshold value.

9. A multi-valued image conversion device according to claim 7, wherein said pixel conversion means divides said N-valued image into a plurality of lines, scans said subject pixel in a predetermined direction along odd-numbered lines of said plurality of lines, and scans said subject pixel in a direction opposite to said predetermined direction along even-numbered lines of said plurality of lines.

10. A multi-valued image conversion program for converting an N-valued (N≧3) image composed of a group of pixels, each pixel capable of taking N values, into an M-valued (N>M≧2) image composed of a group of pixels, each pixel capable of taking M values, said program comprising the step of:

causing a computer to execute a process which is realized as a pixel conversion means for adding an error when neighboring pixels in the neighborhood of a subject pixel are converted into M-valued (N>M≧2) pixels while the subject pixel which is a conversion target within said N-valued image is scanned, to the value of said subject pixel at a predetermined ratio and for converting said subject pixel into an M-valued pixel on the basis of the added value, wherein said pixel conversion means further converts said subject pixel into an M-valued pixel on the basis of the value of said neighboring pixels after conversion.

11. A multi-valued image conversion program for converting an N-valued (N≧3) image composed of a group of pixels, each pixel capable of taking N values, into an M-valued (N>M≧2) image composed of a group of pixels, each pixel capable of taking M values, said program comprising the step of:

causing a computer to execute a process which is realized as a pixel conversion means for adding an error when neighboring pixels in the neighborhood of a subject pixel are converted into M-valued (N>M≧2) pixels while the subject pixel which is a conversion target within said N-valued image is scanned, to the value of said subject pixel at a predetermined ratio and for converting said subject pixel into an M-valued pixel on the basis of the added value, wherein said pixel conversion means computes a threshold value on the basis of a random number value, converts the value of said subject pixel into one of the M values when the value of said subject pixel exceeds said threshold value, and converts the value of said subject pixel into another value of the M values when the value of said subject pixel is equal to or less than said threshold value.

12. A multi-valued image conversion method for converting an N-valued (N≧3) image composed of a group of pixels, each pixel capable of taking N values, into an M-valued (N>M≧2) image composed of a group of pixels, each pixel capable of taking M values, said method comprising:

a pixel conversion step of adding an error when neighboring pixels in the neighborhood of a subject pixel are converted into M-valued (N>M≧2) pixels while the subject pixel which is a conversion target within said N-valued image is scanned, to the value of said subject pixel at a predetermined ratio and converting said subject pixel into an M-valued pixel on the basis of the added value, wherein, in said pixel conversion step, furthermore, said subject pixel is converted into an M-valued pixel on the basis of the values of said neighboring pixels after conversion.

13. A multi-valued image conversion method for converting an N-valued (N≧3) image composed of a group of pixels, each pixel capable of taking N values, into an M-valued (N>M≧2) image composed of a group of pixels, each pixel capable of taking M values, said method comprising:

a pixel conversion step of adding an error when neighboring pixels in the neighborhood of a subject pixel are converted into M-valued (N>M≧2) pixels while the subject pixel which is a conversion target within said N-valued image is scanned, to the value of said subject pixel at a predetermined ratio and converting said subject pixel into an M-valued pixel on the basis of the added value, wherein, in said pixel conversion step, a threshold value is computed on the basis of a random number value, the value of said subject pixel is converted into one of the M values when the value of said subject pixel exceeds said threshold value, and the value of said subject pixel is converted into another value of the M values when the value of said subject pixel is equal to or less than said threshold value.

\* \* \* \* \*